US012668554B2

(12) United States Patent
Burnham et al.

(10) Patent No.: US 12,668,554 B2
(45) Date of Patent: Jun. 30, 2026

(54) DELIVERY OF BIOACTIVE MOLECULES IN PROTECTIVE COATINGS OF SURFACE LAYERS OF ORGANICALLY ENHANCED INORGANIC FERTILIZERS

(71) Applicant: Profile Products LLC, Buffalo Grove, IL (US)

(72) Inventors: Jeffrey C. Burnham, Marco Island, FL (US); Sanford A. Siegel, Bradenton, FL (US); Martin M. Topps, Winter Park, FL (US)

(73) Assignee: PROFILE PRODUCTS LLC, Buffalo Grove, IL (US)

( * ) Notice: Subject to any disclaimer, the term of this patent is extended or adjusted under 35 U.S.C. 154(b) by 885 days.

(21) Appl. No.: 17/573,981

(22) Filed: Jan. 12, 2022

(65) Prior Publication Data

US 2022/0164856 A1    May 26, 2022
US 2023/0140837 A9    May 4, 2023

Related U.S. Application Data

(63) Continuation-in-part of application No. 16/682,885, filed on Nov. 13, 2019, now Pat. No. 11,999,670.
(Continued)

(51) Int. Cl.
C05G 5/30        (2020.01)
C05C 3/00        (2006.01)
(Continued)

(52) U.S. Cl.
CPC ............... C05G 5/30 (2020.02); C05C 3/005 (2013.01); C05F 3/00 (2013.01); C05G 3/60 (2020.02); C05G 5/12 (2020.02); C05G 5/37 (2020.02)

(58) Field of Classification Search
CPC ... C05G 5/37; C05G 3/60; C05G 5/12; C05G 5/30; C05G 5/38; C05B 15/00
See application file for complete search history.

(56) References Cited

U.S. PATENT DOCUMENTS 143,310 A      9/1873   Storer
2,026,969 A    1/1936   Flynn et al.
(Continued)

FOREIGN PATENT DOCUMENTS

CA    2912032    5/2016
CN    1128741    8/1996
(Continued)

OTHER PUBLICATIONS

PCT Search Report and Written Opinion for PCT/US19/61276, dated Jan. 22, 2020.
(Continued)

*Primary Examiner* — Jennifer A Smith
(74) *Attorney, Agent, or Firm* — BROOKS KUSHMAN P.C.

(57) ABSTRACT

The invention is directed to fertilizers and manufacturing methods using organically enhanced inorganic fertilizer granules that incorporate a coating of one or more layers containing a bioactive agent in a carrier. The bioactive agent may be an herbicide, pesticide, plant growth regulator, microorganism, or beneficial element. Manufacture of conventional fertilizers involves stresses such as pH, heat, and pressure that are overcome by providing a protective carrier that facilitates and extends functional survival/effectiveness. Many carriers, such as liquefied dried milk, bind actively to the granule surface and contribute to the total carbon base. The release of the bioactive agent from the coating and or the surface of the fertilizer granule preferably results in a two-phased release, a first fast release and a second extended or slow-release into the soil metering the bioavailability of
(Continued)

the bioactive agent for crop growth or protection, and/or for controlling unwanted vegetation or pests.

14 Claims, 6 Drawing Sheets

Related U.S. Application Data

(60) Provisional application No. 62/767,172, filed on Nov. 14, 2018.

(51) Int. Cl.
| | |
|---|---|
| *C05F 3/00* | (2006.01) |
| *C05G 3/60* | (2020.01) |
| *C05G 5/12* | (2020.01) |

(56) References Cited

U.S. PATENT DOCUMENTS

| | | | |
|---|---|---|---|
| 2,568,901 | A | 9/1951 | Stengel et al. |
| 2,662,881 | A | 12/1953 | Batdorf et al. |
| 2,755,176 | A | 7/1956 | Pearce et al. |
| 2,800,457 | A | 7/1957 | Green et al. |
| 2,800,458 | A | 7/1957 | Green et al. |
| 2,864,685 | A | 12/1958 | Waters et al. |
| 2,902,342 | A | 9/1959 | Kerley et al. |
| 3,050,383 | A | 8/1962 | Wilson et al. |
| 3,259,482 | A | 7/1966 | Hansen et al. |
| 3,264,088 | A | 8/1966 | Hansen et al. |
| 3,264,089 | A | 8/1966 | Hansen et al. |
| 3,304,588 | A | 2/1967 | Mcilvaine et al. |
| 3,306,730 | A | 2/1967 | Malmberg |
| 3,336,128 | A | 8/1967 | Holik |
| 3,345,288 | A | 10/1967 | Heinrich et al. |
| 3,475,154 | A | 10/1969 | Kato et al. |
| 3,476,683 | A | 11/1969 | Liljegren et al. |
| 3,655,395 | A | 4/1972 | Karnemaat et al. |
| 3,756,784 | A | 9/1973 | Pittwood |
| 3,796,669 | A | 3/1974 | Kiritani et al. |
| 3,837,872 | A | 9/1974 | Conner |
| 3,915,853 | A | 10/1975 | Luck |
| 3,939,280 | A | 2/1976 | Karnemaat |
| 3,942,970 | A | 3/1976 | O'Donnell |
| 3,960,718 | A | 6/1976 | Lebo |
| 3,966,450 | A | 6/1976 | O'Neill et al. |
| 4,001,140 | A | 1/1977 | Foris et al. |
| 4,076,515 | A | 2/1978 | Rickard |
| 4,079,003 | A | 3/1978 | Manchak |
| 4,100,103 | A | 7/1978 | Foris et al. |
| 4,108,771 | A | 8/1978 | Weiss |
| 4,124,405 | A | 11/1978 | Quienot |
| 4,134,750 | A | 1/1979 | Norton et al. |
| 4,154,593 | A | 5/1979 | Brown et al. |
| 4,180,459 | A | 12/1979 | Zievers |
| 4,219,347 | A | 8/1980 | Young |
| 4,230,568 | A | 10/1980 | Chappell |
| 4,249,929 | A | 2/1981 | Kneer |
| 4,270,279 | A | 6/1981 | Roediger |
| 4,304,588 | A | 12/1981 | Moore, Jr. |
| 4,306,978 | A | 12/1981 | Wurtz |
| 4,377,406 | A | 3/1983 | Achorn et al. |
| 4,377,486 | A | 3/1983 | Barrick et al. |
| 4,405,354 | A | 9/1983 | Thomas, II et al. |
| 4,454,259 | A | 6/1984 | Reischl et al. |
| 4,500,428 | A | 2/1985 | Lynch et al. |
| 4,514,307 | A | 4/1985 | Chestnut et al. |
| 4,519,831 | A | 5/1985 | Moore |
| 4,541,986 | A | 9/1985 | Schwab et al. |
| 4,554,002 | A | 11/1985 | Nicholson |
| 4,601,863 | A | 7/1986 | Shioi et al. |
| 4,619,684 | A | 10/1986 | Salladay et al. |
| 4,655,932 | A | 4/1987 | Roslonski |
| 4,659,472 | A | 4/1987 | Nordlund et al. |
| 4,711,659 | A | 12/1987 | Moore |
| 4,743,287 | A | 5/1988 | Robinson |
| 4,772,490 | A | 9/1988 | Kogler et al. |
| 4,781,842 | A | 11/1988 | Nicholson |
| 4,786,307 | A | 11/1988 | Marihart |
| 4,792,349 | A | 12/1988 | Trimm et al. |
| 4,793,927 | A | 12/1988 | Meehan et al. |
| 4,857,458 | A | 8/1989 | Nobilet et al. |
| 4,902,431 | A | 2/1990 | Nicholson et al. |
| 4,966,706 | A | 10/1990 | Gregor |
| 4,997,572 | A | 3/1991 | Wurtz |
| 5,013,458 | A | 5/1991 | Christy, Sr. et al. |
| 5,051,031 | A | 9/1991 | Schumacher et al. |
| 5,087,375 | A | 2/1992 | Weinwurm |
| 5,102,556 | A | 4/1992 | Wong |
| 5,118,337 | A | 6/1992 | Bleeker |
| 5,125,951 | A | 6/1992 | Lahoda et al. |
| 5,135,664 | A | 8/1992 | Burnham |
| 5,147,563 | A | 9/1992 | Long, Jr. et al. |
| 5,183,577 | A | 2/1993 | Lehmann |
| 5,238,480 | A | 8/1993 | Rehberg et al. |
| 5,252,116 | A | 10/1993 | Markham et al. |
| 5,259,977 | A | 11/1993 | Girovich et al. |
| 5,275,733 | A | 1/1994 | Burnham |
| 5,340,376 | A | 8/1994 | Cunningham |
| 5,342,442 | A | 8/1994 | Nechvatal et al. |
| 5,346,527 | A | 9/1994 | Rehbein et al. |
| 5,356,540 | A | 10/1994 | Khan et al. |
| 5,385,673 | A | 1/1995 | Fergen |
| 5,393,317 | A | 2/1995 | Robinson |
| 5,401,402 | A | 3/1995 | Christy et al. |
| 5,409,605 | A | 4/1995 | Haley et al. |
| 5,417,861 | A | 5/1995 | Burnham |
| 5,419,839 | A | 5/1995 | Haley et al. |
| 5,422,015 | A | 6/1995 | Angell et al. |
| 5,435,923 | A | 7/1995 | Girovich |
| 5,443,613 | A | 8/1995 | Robinson |
| 5,466,273 | A | 11/1995 | Connell |
| 5,500,044 | A | 3/1996 | Meade et al. |
| 5,554,279 | A | 9/1996 | Christy |
| 5,556,445 | A | 9/1996 | Quinn et al. |
| 5,580,458 | A | 12/1996 | Yamasaki et al. |
| 5,593,590 | A | 1/1997 | Steyskal |
| 5,593,591 | A | 1/1997 | Ohsol et al. |
| 5,603,842 | A | 2/1997 | Whitaker et al. |
| 5,618,442 | A | 4/1997 | Christy |
| 5,635,069 | A | 6/1997 | Boss et al. |
| 5,669,969 | A | 9/1997 | Meade et al. |
| 5,679,129 | A | 10/1997 | Hon |
| 5,681,481 | A | 10/1997 | Christy et al. |
| 5,722,721 | A | 3/1998 | Batoff et al. |
| 5,733,355 | A | 3/1998 | Hibino et al. |
| 5,766,302 | A | 6/1998 | Lefroy et al. |
| 5,783,073 | A | 7/1998 | Christy et al. |
| 5,807,724 | A | 9/1998 | Resnick |
| 5,849,060 | A | 12/1998 | Diping et al. |
| 5,853,450 | A | 12/1998 | Burnham et al. |
| 5,853,590 | A | 12/1998 | Burnham |
| 5,862,610 | A | 1/1999 | Lipert |
| 5,876,613 | A | 3/1999 | Bonnin et al. |
| 5,906,750 | A | 5/1999 | Haase |
| 5,916,448 | A | 6/1999 | Fergen |
| 5,984,992 | A | 11/1999 | Greer et al. |
| 5,993,505 | A | 11/1999 | Tijsma et al. |
| 6,051,411 | A | 4/2000 | Turtakovsky et al. |
| 6,080,221 | A | 6/2000 | Moore |
| 6,103,191 | A | 8/2000 | Luker |
| 6,117,406 | A | 9/2000 | Vogel et al. |
| 6,159,263 | A | 12/2000 | Greer et al. |
| 6,165,550 | A | 12/2000 | Markusch et al. |
| 6,176,891 | B1 | 1/2001 | Komoriya et al. |
| 6,187,074 | B1 | 2/2001 | von Locquenghien et al. |
| 6,237,246 | B1 | 5/2001 | Millard |
| 6,237,264 | B1 | 5/2001 | Gulick, Jr. |
| 6,256,902 | B1 | 7/2001 | Flaherty et al. |
| 6,284,278 | B1 | 9/2001 | Waldman et al. |
| 6,325,035 | B1 | 12/2001 | Codina et al. |
| 6,331,300 | B1 | 12/2001 | Dybas et al. |
| 6,387,145 | B1 | 5/2002 | Miele et al. |
| 6,398,840 | B1 | 6/2002 | Orta-Castro et al. |

(56) References Cited

U.S. PATENT DOCUMENTS

| | | |
|---|---|---|
| 6,406,510 B1 | 6/2002 | Burnham |
| 6,409,788 B1 | 6/2002 | Sower |
| 6,409,789 B1 | 6/2002 | Gilbert |
| 6,416,983 B1 | 7/2002 | Cheung et al. |
| 6,461,399 B1 | 10/2002 | Connell |
| 6,465,706 B1 | 10/2002 | Rogers et al. |
| 6,517,599 B2 | 2/2003 | Gilbert |
| RE38,238 E | 8/2003 | Nicholson et al. |
| 6,623,650 B2 | 9/2003 | Millard |
| 6,666,154 B2 | 12/2003 | Logan et al. |
| 6,716,360 B2 | 4/2004 | Titmas |
| 6,752,848 B2 | 6/2004 | Logan et al. |
| 6,752,849 B2 | 6/2004 | Logan et al. |
| 6,758,879 B2 | 7/2004 | Greer et al. |
| 6,828,132 B2 | 12/2004 | Cheung et al. |
| 6,841,515 B2 | 1/2005 | Burnham |
| 6,852,142 B2 | 2/2005 | Varshovi |
| 6,966,941 B1 | 11/2005 | Grobler et al. |
| 7,128,880 B2 | 10/2006 | Dahms et al. |
| 7,497,956 B2 | 3/2009 | Blais et al. |
| 7,513,927 B2 | 4/2009 | Faulmann et al. |
| 7,604,742 B2 | 10/2009 | Shankar et al. |
| 7,662,205 B2 | 2/2010 | Burnham |
| 7,789,931 B2 | 9/2010 | Burnham et al. |
| 7,947,104 B2 | 5/2011 | Burnham et al. |
| 7,947,105 B2 | 5/2011 | Burnham |
| 8,057,569 B2 | 11/2011 | Burnham et al. |
| 8,105,413 B2 | 1/2012 | Burnham |
| 8,202,342 B2 | 6/2012 | Burnham |
| 8,242,053 B2 | 8/2012 | Hakalehto |
| 8,470,065 B1 | 6/2013 | Burnham |
| 8,557,013 B2 | 10/2013 | Burnham et al. |
| 8,597,394 B2 | 12/2013 | Burnham |
| 8,864,868 B2 | 10/2014 | Burnham |
| 8,920,733 B2 | 12/2014 | Burnham et al. |
| 8,992,654 B2 | 3/2015 | Dahms et al. |
| 9,233,882 B2 | 1/2016 | Burnham |
| 9,328,030 B2 | 5/2016 | Burnham et al. |
| 9,540,291 B2 | 1/2017 | Wheeler et al. |
| 9,580,363 B2 | 2/2017 | Zhang |
| 9,586,869 B1 | 3/2017 | Burnham et al. |
| 9,695,092 B2 | 7/2017 | Burnham et al. |
| 9,856,178 B2 | 1/2018 | Burnham et al. |
| 10,487,016 B2 | 11/2019 | McLaughlin |
| 2002/0098982 A1 | 7/2002 | Burnham |
| 2002/0157439 A1 | 10/2002 | Gilbert |
| 2003/0070460 A1 | 4/2003 | Logan et al. |
| 2003/0089151 A1 | 5/2003 | Logan et al. |
| 2003/0121302 A1 | 7/2003 | Oliver et al. |
| 2003/0136165 A1 | 7/2003 | Logan et al. |
| 2003/0157247 A1 | 8/2003 | Chikami |
| 2004/0031303 A1 | 2/2004 | Whitehurst |
| 2004/0065127 A1 | 4/2004 | Connell |
| 2004/0120867 A1 | 6/2004 | Dahms et al. |
| 2004/0177664 A1 | 9/2004 | Hale |
| 2005/0005660 A1 | 1/2005 | Burnham et al. |
| 2005/0019207 A1 | 1/2005 | Oliver et al. |
| 2005/0022569 A1 | 2/2005 | Varshovi |
| 2005/0039508 A1 | 2/2005 | Burnham et al. |
| 2005/0077245 A1 | 4/2005 | Blais et al. |
| 2005/0138978 A1 | 6/2005 | Porubcan |
| 2006/0243009 A1 | 11/2006 | Burnham |
| 2006/0254331 A1 | 11/2006 | Burnham |
| 2007/0062233 A1 | 3/2007 | Burnham |
| 2007/0257715 A1 | 11/2007 | Semerdzhiev et al. |
| 2008/0000279 A1 | 1/2008 | Faulmann et al. |
| 2008/0034822 A1 | 2/2008 | Burnham et al. |
| 2008/0230484 A1 | 9/2008 | Burnham et al. |
| 2010/0139345 A1 | 6/2010 | Burnham |
| 2010/0139346 A1 | 6/2010 | Burnham |
| 2010/0255050 A1 | 10/2010 | Leonard et al. |
| 2010/0288003 A1 | 11/2010 | Burnham et al. |
| 2012/0247164 A1 | 10/2012 | Dahms et al. |
| 2012/0272700 A1 | 11/2012 | Nevin |
| 2014/0090430 A1 | 4/2014 | Tariq et al. |
| 2014/0137616 A1 | 5/2014 | Peacock et al. |
| 2014/0323297 A1 | 10/2014 | Harman et al. |
| 2014/0342905 A1* | 11/2014 | Bullis .................... A01N 63/20 |
| | | 504/100 |
| 2015/0027180 A1 | 1/2015 | Tuttle |
| 2015/0135785 A1 | 5/2015 | Wang et al. |
| 2015/0191399 A1 | 7/2015 | Dahms |
| 2015/0210604 A1 | 7/2015 | Ledoux |
| 2016/0137560 A1 | 5/2016 | Burnham |
| 2016/0200634 A1 | 7/2016 | Zaseybida et al. |
| 2016/0229763 A1 | 8/2016 | Wheeler |
| 2016/0244377 A1 | 8/2016 | Hartmann |
| 2016/0297725 A1 | 10/2016 | No et al. |
| 2016/0340266 A1* | 11/2016 | Jablon ..................... C05G 3/20 |
| 2016/0355443 A1 | 12/2016 | Burnham et al. |
| 2016/0355444 A1 | 12/2016 | Olkowski |
| 2017/0066692 A1 | 3/2017 | Ledoux |
| 2017/0066693 A1 | 3/2017 | Ledoux |
| 2017/0232419 A1 | 8/2017 | Dahms et al. |
| 2018/0179117 A1 | 6/2018 | Socolovsky |
| 2019/0194084 A1 | 6/2019 | Khaleel |
| 2019/0300451 A9 | 10/2019 | Mcknight et al. |
| 2021/0101847 A1 | 4/2021 | Harman et al. |
| 2021/0300833 A1 | 9/2021 | Sellars et al. |

FOREIGN PATENT DOCUMENTS

| | | |
|---|---|---|
| CN | 1184092 | 6/1998 |
| CN | 1215040 | 4/1999 |
| CN | 104291899 | 1/2015 |
| CN | 108164333 | 6/2015 |
| CN | 107162645 | 9/2017 |
| CN | 107285847 | 10/2017 |
| CN | 108164333 A | 6/2018 |
| CN | 108911909 | 11/2018 |
| CN | 105777329 | 11/2019 |
| CN | 110922249 | 3/2020 |
| CN | 106754515 | 4/2020 |
| CN | 111848261 | 10/2020 |
| CN | 111978116 | 11/2020 |
| CN | 112094149 | 12/2020 |
| CN | 112125742 | 12/2020 |
| CN | 108752092 | 5/2021 |
| CN | 113121284 | 7/2021 |
| CN | 113233930 | 8/2021 |
| DE | 2523628 | 12/1976 |
| DE | 2800915 | 9/1978 |
| DE | 4127459 | 2/1993 |
| EP | 0143392 | 6/1985 |
| EP | 0356781 | 3/1990 |
| EP | 0303632 | 3/1992 |
| EP | 0557078 | 8/1993 |
| EP | 0770586 | 5/1997 |
| EP | 1363865 | 11/2003 |
| EP | 3322679 | 7/2019 |
| EP | 3749627 | 11/2021 |
| FR | 2133115 | 11/1972 |
| FR | 2757504 | 6/1998 |
| FR | 3004448 | 12/2017 |
| JP | 58032638 | 2/1983 |
| JP | 9110570 | 4/1997 |
| JP | 2001129597 | 5/2001 |
| JP | WO01/096260 | 12/2001 |
| JP | 2002248454 | 9/2002 |
| JP | 2002308689 A | 10/2002 |
| JP | 2003-081705 | 3/2003 |
| JP | 2016-505479 | 2/2016 |
| KR | 10-0399401 | 9/2003 |
| KR | 10-1017576 | 2/2011 |
| KR | 10-1388907 | 4/2014 |
| WO | WO8102888 | 10/1981 |
| WO | WO95/04814 | 2/1995 |
| WO | WO9856735 | 12/1998 |
| WO | WO9947282 | 9/1999 |
| WO | WO0136082 | 5/2001 |
| WO | WO0136887 | 5/2001 |
| WO | WO0168562 | 9/2001 |
| WO | WO0169150 | 9/2001 |
| WO | WO03045852 | 6/2003 |

(56) References Cited

FOREIGN PATENT DOCUMENTS

| WO | WO04094320 | 11/2004 |
|----|------------|---------|
| WO | WO08101250 | 8/2008 |
| WO | WO2015/075644 | 5/2015 |
| WO | WO1575644 | 5/2015 |
| WO | WO2017/051058 | 3/2017 |

OTHER PUBLICATIONS

Search Report for EPO Application No. 19884701.4 dated Jul. 13, 2022.

Examination Report for EPO Application No. 19884701.4 dated Jul. 13, 2022.

Amaya-Carpio et al., "Arbuscular mycorrhizal fungi and organic fertilizer influence photosynthesis, root phosphatase activity, nutrition, and growth of *Ipomoea carnea* ssp. Fistulosa," Photosynthetica 47 (1): 1-10, 2009.

Hussain et al., "Production and Implication of Bio-Activated Organic Fertilizer Enriched with Zinc-Solubilizing Bacteria to Boost up Maize (*Zea mays* L.) Production and Biofortification under Two Cropping Seasons," Agronomy 2020, 10, 39 (18 pages).

Mattiello et al., "Sulfur and Zinc Availability from Co-granulated Zn-Enriched Elemental Sulfur Fertilizers," J Agric Food Chem, Feb. 15, 2017;65(6):1108-1115.

Pitaktamrong et al., "Development of Arbuscular Mycorrhizal Fungi-Organic Fertilizer Pellets Encapsulated with Alginate Film," Engineering Journal, vol. 22, Issue 6, pp. 65-79, 2018.

Tahir et al., "Combined application of bio-organic phosphate and phosphorus solubilizing bacteria (Bacillus strain MWT 14) improve the performance of bread wheat with low fertilizer input under an arid climate," Brazilian Journal of Microbiology, 49S (2018) 15-24.

Examination report for MA Application No. PV/50736 dated Jun. 1, 2021.

Examination report for MA Application No. PV/50736 dated Jun. 1, 2021 (translated).

Office action received for Canadian Application No. 3,120,061 dated Oct. 4, 2022.

Office action of JP Application No. 2021-526473 dated Aug. 16, 2022.

Office action of JP Application No. 2021-526473 dated Aug. 16, 2022 (translated).

Examination Report for JP Application No. 2021-526473 dated Mar. 7, 2023.

Examination Report for JP Application No. 2021-526473 dated Mar. 7, 2023 (translated).

Examination Report for Application No. AP/P/2020/012591 dated Jul. 15, 2022.

NPL_Israeli Office Action dated Jan. 11, 2024 for patent application 283198 which issued in a related application.

Office action received for Indian Application No. 202117026038 dated Nov. 1, 2022.

Examination Report for CA Application No. 3,120,061 dated Apr. 4, 2023.

Examination Report for Application No. BR 11 2021 009417 2 dated Feb. 2, 2023.

Examination Report for Application No. BR 11 2021 009417 2 dated Feb. 2, 2023 (translated).

NPL_EP OA dated Dec. 10, 2025 which issued in related EP Application No. 19884701.4.

* cited by examiner

Organic carrier layer containing bioactive agents

Deduster layer applied during granule manufacture

Granule core

Outer protective surface layer

Organic carrier layer containing bioactive agents

Deduster layer applied during granule manufacture

Granule core

DELIVERY OF BIOACTIVE MOLECULES IN PROTECTIVE COATINGS OF SURFACE LAYERS OF ORGANICALLY ENHANCED INORGANIC FERTILIZERS

REFERENCE TO RELATED APPLICATIONS

This application is a continuation-in-part of U.S. application Ser. No. 16/682,885 filed Nov. 13, 2019, now U.S. Pat. No. 11,999,670, issued Jun. 4, 2024, and claims priority to U.S. Application No. 62/767,172 filed Nov. 14, 2018 (expired), the entirety of each of which is incorporated by reference.

BACKGROUND

1. Field of the Invention

This invention is directed to organic-containing inorganic fertilizers and, in particular, to the incorporation of bioactive substances such as, for example, herbicides and pesticides into fertilizer layers or coatings such that the treated fertilizer can be used as an effective inhibitor or killing agent for unwanted vegetation or pests, or to provide nutrients or other beneficial elements to crops. Further, the invention is directed to organic carriers for bioactive substances and agents that protect the functional activity and/or viability of the bioactive substances and agents. The organic-containing inorganic complex fertilizer may include salts of potassium, ammonium, phosphate, and sulfate, or combinations thereof.

2. Description of the Background

Most fertilizers, such as those that consist of or comprise ammonium sulfate, urea, diammonium phosphate, monoammonium phosphate or calcium phosphate are not manufactured specifically to have concentric layers. Some fertilizer granules are however made with specific coatings. These coatings can help control the rate of nutrient release to treated soil and help prevent dusting of the granule itself. For example, U.S. Pat. No. 6,165,550 relates to the production of symmetrical fertilizer granules that are coated with poly-urea-urethane to slow leaching of the granule nutrients into the soil. Other granules, as found in U.S. Pat. Nos. 5,679, 129; 6,176,891 and 5,993,505, relate to a synthetic resin or polymer film on the surface of the granule to control the release of plant nutrients from the interior of the granule. Similarly, U.S. Pat. No. 6,187,074 relates to a coating of carboxyl-carrying ethylene copolymer to contain inorganic or organic fertilizer such that it is released slowly over time to the target crops. These coatings can be expensive but more importantly can adversely affect the activity of bioactive agents.

Very often these coatings are applied as very hot substances which can be very negative for bioactive agents. U.S. Pat. Nos. 5,984,992; 6,159,263; 6,758,879 and 7,128, 880 all teach production of a organic containing inorganic granular fertilizer that is coated with oils to reduce dusting. The oils are applied at temperatures of 150° F. to 200° F. (65° C.-93° C.). Similarly, U.S. Pat. Nos. 7,947,104; 8,557, 013; 8,992,654; and 9,856,178 also apply hot oils in a similar range of 65° C. to 93° C. to organically-enhanced inorganic granular fertilizers. Other polymers are also used in granule coatings such as polyurethanes. These also require high temperatures in the same 60° C. to 100° C. range for application. Such heated oil and polymer coatings can be negative stresses on the functional activity of bioactive agents and on the viability of contained microorganisms.

Thus, a need exists for a fertilizer product and method of coating that does not result in the reduction of bioactive agent activity and viability, but also promotes maximal functional activity of contained bioactive agents and/or viability of contained microorganisms.

SUMMARY OF THE INVENTION

The present invention overcomes the problems and disadvantages associated with current strategies and designs and provides new fertilizers and methods of preparing fertilizers and, in particular, coating granules of fertilizer.

One embodiment of the invention is directed to methods of coating fertilizer granules comprising: providing fertilizer granules comprised of organic material; contacting the fertilizer granules with a bioactive agent that chemically reacts with the surfaces of the fertilizer granules; and drying the fertilizer granules forming dried fertilizer granules. Preferably the organic material is sulfate-based and/or phosphate-based, and granules are contacted with a coating agent that comprises a tall oil (also called liquid rosin or tallol), latex, an amide-linked hydrocarbon compound, urethane or poly-urethanes, acrylics or polyacrylics) or crystalline and or non-crystalline paraffin waxes. Preferably the fertilizer granules contain one or more of sulfate or phosphate molecules, organic molecules, or iron or aluminum molecules, which bind to the bioactive agent. Preferably the bioactive agent comprises an herbicide, a pesticide, a microbe, a plant growth regulator such as, for example, bioactive agents that are anionic, cationic, nonionic and/or lipophilic. Preferably the coated fertilizer granules further contain a coating that contains and protects the bioactive agent. Preferably each coating layer in a multiple coated granule comprises from about 5 to about 40 pounds per ton of dried fertilizer granules, or more preferably from about 10 to about 20 pounds per ton of dried fertilizer granules. Preferably the dried fertilizer granules comprise from about 92% to about 100% solids, from about 96% to about 99% solids, or from about 98% to about 99% solids.

Another embodiment of the invention is directed to dried fertilizer granules containing the coatings and/or bioactive agents disclosed and described herein that are made by the methods disclosed and described herein.

Another embodiment of the invention is directed to the system of manufacturing fertilizer granules comprising a granulator for forming fertilizer granules as disclosed and described herein as well as a coating system for protecting the functional activity and/or viability of bioactive agents during their storage in the coating liquid prior to application, the application process to the granules, their presence on the granules during warehousing, shipping and subsequent grower handling and field application.

Other embodiments and advantages of the invention are set forth in part in the description, which follows, and in part, may be obvious from this description, or may be learned from the practice of the invention.

DESCRIPTION OF THE FIGURES

FIG. 2. Basic reaction between secondary amine on a bioactive molecule and a bisulfate molecule present in or on a fertilizer surface.

FIG. 3. Diagram of a pesticide or a plant growth regulator example—the herbicide (Atrazine) binding to a bisulfate group on surface of a fertilizer granule.

DESCRIPTION OF THE INVENTION

Figure 1A:
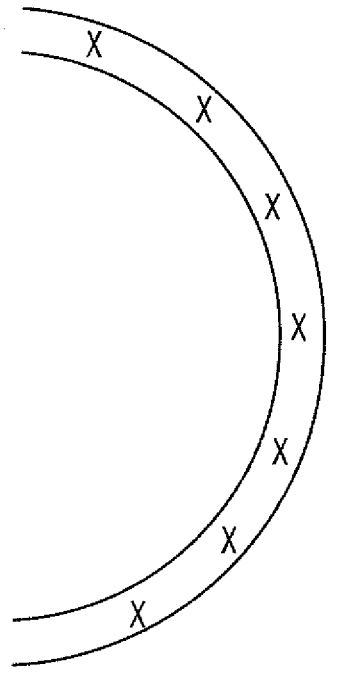
FIG. 1A. Schematic of a portion of a fertilizer granule with bioactive molecules (X) distributed around a core.
Figure 1B:
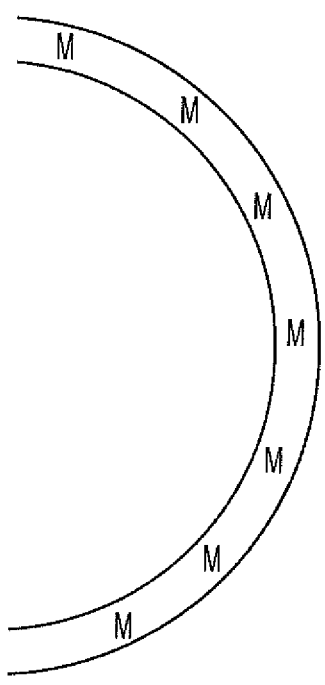
FIG. 1B. Schematic of a portion of a fertilizer granule with viable microorganisms (M) distributed around a core.
Figure 1C:
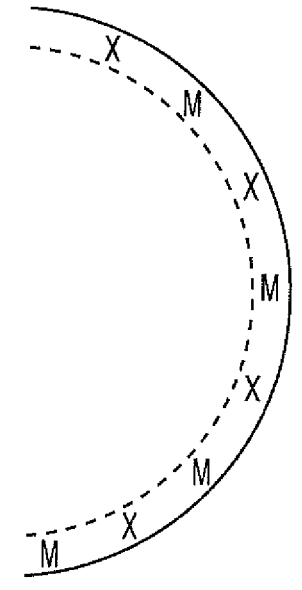
FIG. 1C. Schematic of a portion of a fertilizer granule with bioactive molecules (X) and viable microorganisms (M) distributed around a core.
Figure 1D:
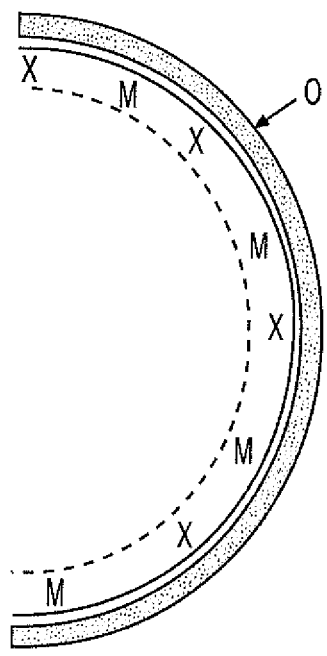
FIG. 1D. Schematic of a portion of a fertilizer granule with bioactive molecules (X) and viable microorganisms (M) distributed around a core with a protective outer coating (O).

Fertilizers are and have been utilized throughout the world for many years and are applied to crops routinely. Often a particular crop will require herbicides or pesticides to control unwanted weeds or pests, requiring additional applications to the crop. In addition, fertilizers are typically granular in form and thereby create significant dust that reduces the amount of fertilizer that reaches the intended target—the plant.

A coated fertilizer has been surprisingly discovered that does not result in harmful or unwanted substances entering the soil, but instead provides multiple advantages. As disclosed and described herein, methods of coating fertilizer granules and the coated granules themselves incorporate bioactive agents into organic protective coatings that protect and prolong their effectivity. These agents preferably are incorporated into a coating or contain reactive chemical groups that interact with the fertilizer granules such that the bioactive compounds bind to components of the coating and/or diffuse within the core fertilizer granule. Preferably, the bioactive agent employed in the coating exhibits a combination of chemical functional characteristics as anionic or cationic, or suitable solubility in the organic coating and organic matrix of the granule. Coated fertilizers as described herein provide direct and/or indirect benefit to plants which include killing, inhibiting and/or controlling unwanted vegetation, pests such as insects or parasites, and preventing or controlling diseases (e.g., as may be caused by bacterial or fungal infections, or other microorganisms). Also disclosed and described herein are methods for the production and use of coated granular fertilizers and the incorporation of bioactive agents within the coatings.

The manufacture of fertilizer is well known, with most solid fertilizers manufactured in granular form. Although any fertilizer granules can be coated as described herein, preferred fertilizer granules for coating include fertilizers made from organic materials such as organically-enhanced inorganic fertilizers (e.g., see U.S. Pat. Nos. 7,513,927; 7,662,205; 7,662,206; 7,947,104; 8,105,413; 8,557,013; 8,992,654 and 9,856,178). Many desirable procedures for generating the core for the fertilizer involve high heat that kill organisms (e.g., see U.S. Pat. Nos. 6,841,515, 8,992,654, and 9,856,178). For example, many organic materials may be brought to a high temperature to achieve the USEPA's Class A standard for treatment of pathogens and then cooled. The bioactive agents can be incorporated into and/or onto the granules during the manufacturing process and preferably after the application of high heat that would otherwise destroy or damage the bioactive agent.

One embodiment of the invention is directed to coated fertilizer granules wherein the coating of the fertilizer granule contains one or more bioactive agents. Coating agents may be applied as liquids or solids (e.g., powder coatings), and include, for example, oil-based agent, alcohol-bases agents, waxes, polymers, urethanes including polyurethanes, crystalline and non-crystalline paraffins, tall oil fatty acid (also called liquid rosin or tallol, which is a low cost, viscous yellow-black odorous liquid chemical compound that is a product of crude tall oil vacuum distillation; a member of the product family of oleic acid), calcium-containing compounds, sulfur-containing compounds, phosphate-containing compounds, silicon-containing compounds, metal-containing compounds (e.g., ferrous or ferric iron, salts of boron, magnesium, or manganese), latex compounds, fatty acids, lipids, proteins, saccharides and polysaccharides, and combinations thereof. Coatings may form hard surfaces or be porous or non-porous surfaces. Various coatings and method and systems of coating that may be employed include, for example, those disclosed in U.S. Pat. No. 10,266,620 (issued Apr. 23, 2019), U.S. Pat. No. 10,207,284 (issued Feb. 19, 2019), U.S. Pat. No. 9,844,793 (issued Dec. 19, 2017), U.S. Pat. No. 9,539,371 (issued Jan. 10, 2017), and U.S. Pat. No. 9,267,052 (issued Feb. 23, 2016), all of which are incorporated by reference. Coating agents may be mixed with bioactive agents and together applied to granules or applied individually but separately. When applied separately, generally the bioactive agent would be applied to the granules and the coating agent after thereby encompassing the bioactive agent and granule.

Many bioactive agents are heat sensitive that involve processes that do not involve excess heating. Processes may include such bioactive agents in an organic protective carrier layer, such as a liquefied or non-liquefied dry milk, that does not involve temperatures which will inactivate these bioactive agents. Dry milk powder (e.g., which may be liquefied) can be the primary carrier and mixed or added to others as secondary, etc. Carriers may be comprised of, but are not limited to one or more of: agar agar, almond flour, amaranth flour, aquafaba-synthetic egg white, buckwheat flour, chickpea flour, cocoa flour, corn starch, cream, dry milk powder, egg white, gelatin, gluten, guan gum, lignosulfonate, liquid glucose, microcrystalline cellulose, nut butter, polyacrylamides, potato starch, povidone (poly vinylacetate), sorgum flour, soy flour, soy powder, spoiled milk, tapioca, teff flour, wheat flour, whey, and xanthum gum.

Bioactive agents may be fluids, liquids or solids, such as dry powder (e.g., freeze dried material). Preferably a liquid bioactive agent is mixed with an agent that adheres to the fertilizer granules during processing, or a solid bioactive agent is mixed with a liquid adhering agent and applied to the fertilizer granules. Preferably incorporation involves amide based and/or wax-based coatings that are applied to the fertilizer including the utilization of specific surfactants when necessary. A bioactive agent may also serve as part or all of a coating agent.

Bioactive agents include substances e.g., (synthetic or natural chemicals, compounds, chemical constructions, enzymes, and/or microbes) that directly or indirectly benefit the soil or fauna where the fertilizer is to be applied. Examples of agents that are directly beneficial include, for example, nutrients, and plant growth regulators (e.g., plant hormones). Plant growth regulations are chemical substances that influence the growth and/or differentiation of plant cells, tissues and organs. Plant growth regulators function as chemical messengers for intercellular communication in the plant. Plant growth regulators include, for example, auxins, gibberellins, cytokinins, abscisic acid, and derivative and variations thereof. Bioactive agents that provide indirect benefits include, for example, herbicides, insecticides, and fungicides that kill off or control the growth of invasive plants or infections organisms. Additional bioactive agents include microorganism, such as microorganism that fix nitrogen from the air and other sources for the benefit of plants, or beneficial microorganisms that kill or otherwise control the proliferation of harmful organisms or other microbes. In addition, preferred bioactive agents are: (a) anionic; (b) cationic; or (c) nonionic or lipophilic that are applied though the mediation of a surfactant contained in the fertilizer coating.

Examples of herbicides that can be effectively contained coatings are members of the herbicide classes of triazines, glyphosates, aryloxyphenoxy compounds, imidazolinones, isoxazolidinones, sulfonylureas, triazolpyramidines, dinitroanilines and benzoic acid herbicides among others. An example of a pesticide for these coatings is phenyl pyrazole (Fipronil) with its high solubility in wax materials and its amine binding to the fertilizer granule. Examples of such are auxins, gibberellins, cytokinins, and abscisic acid as well as growth inhibitors, growth retardants and growth stimulators. Various chemicals that can be used to coat the fertilizer granule, for example, are described in Ullmann's Encyclopedia of Industrial Chemistry, published by Wiley-VCH Verlag GmbH & Co. KGaA (2002) (incorporated by reference), in particularly the chapters discussing fertilizer granulation. Bioactive agents may comprise detergents (e.g., ionic or non-ionic), enzymes, and/or natural products (e.g., Diatomaceous earth).

Coatings of the fertilizer may contain the bioactive agent or encompass the bioactive agent such that no or substantially no bioactive agents are present on granule surfaces. Traditional coating agents include, for example, a latex, a paraffin (e.g., crystalline or non-crystalline paraffin), an acrylamide (e.g., polyacrylamide), a urethane (e.g., polyurethane), a tall oil, a calcium-containing compound, a silicon-containing compound, or a combination thereof. Preferably these agents are utilized in combination with an organic carrier containing the bioactive agent, that can act as a coating itself and importantly protect the activity of the bioactive agent contained within.

Figures 2, 3:
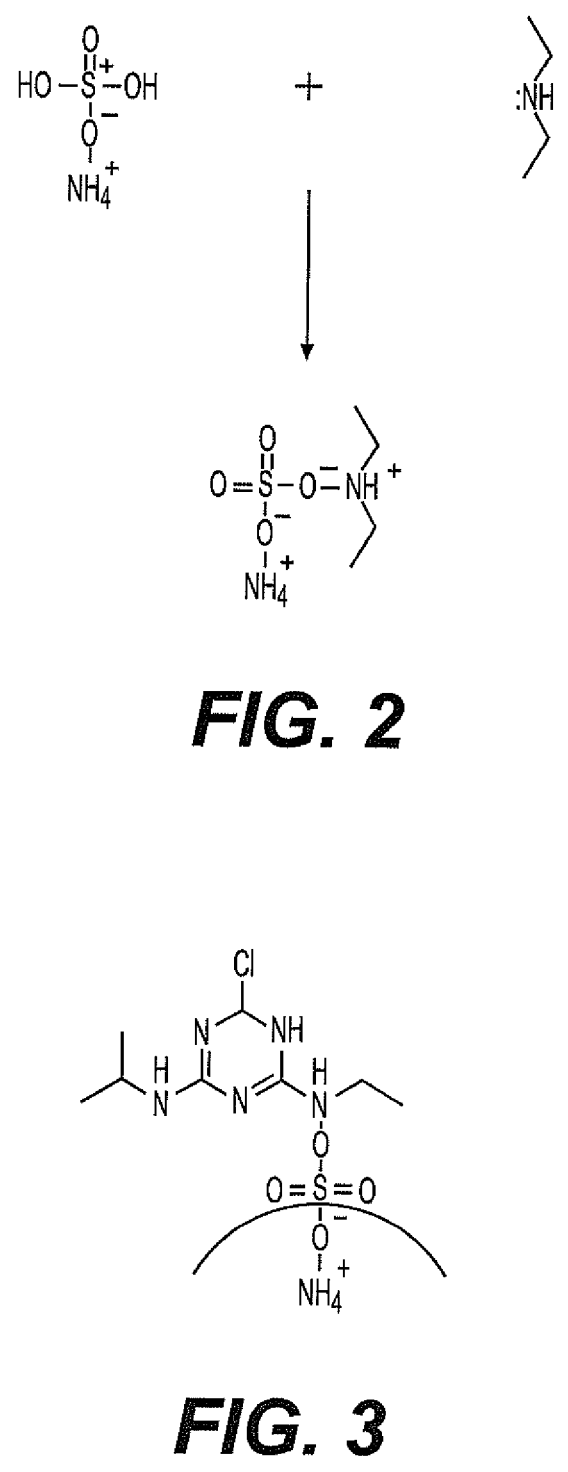

Preferably the core fertilizer granule contains a matrix comprised of organic molecules (e.g., biomass), especially amphoteric molecules. The positive and negative charges of the molecules bind to inorganic nutrient components such as the ammonium ion or sulfate ion as in the case of an ammonium sulfate fertilizer. The outer zones of this matrix with its amphoteric charges can be a binding mechanism for the bioactive agent such as a microbe, pesticide or plant growth regulator. A layer or coating material is processed to a) form a barrier to rapid dissolution of the granule components including the incorporated bioactive agent, b) to bind up nutrients and micronutrients as needed, and c) to protect the granule as from humidity and handling and reduce dust formation. Molecular binding of the bioactive agent to the granule may be to the sulfate or phosphate groups that are exposed in and/or on the surface of granules especially in the outer zone of the core or on the core surface. The bioactive agent binding to the sulfate and phosphate groups can be ionic in nature (see FIG. 2). Similarly, the binding of these agents to the organics or organic matrix can be electrostatic/ionic bonding. When the bioactive agent binds to the amide bond contained in the coating material it is also of an ionic nature. Binding may be covalent, non-covalent (e.g. ionic), or both.

Figure 7:
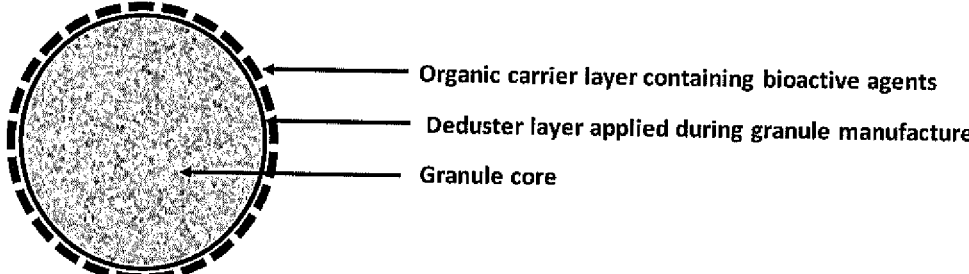
FIG. 7. An organically-enhanced inorganic fertilizer granule with an inner protective layer and an outer organic carrier layer containing one or more bioactive agents.
Figure 8:
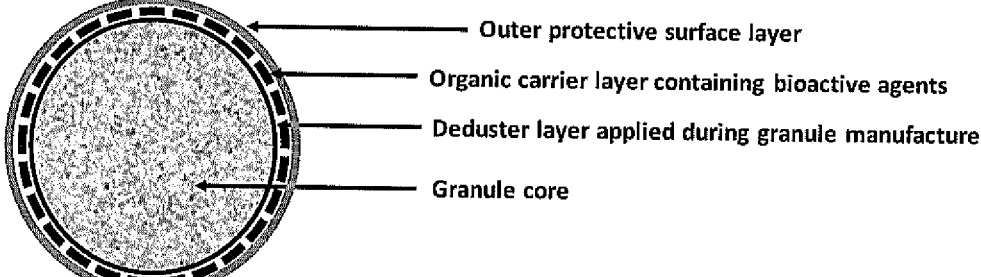
FIG. 8. An organically-enhanced inorganic fertilizer granule with an inner protective layer, an organic carrier layer containing one or more bioactive agents and an outer protective layer comprised of an oil, wax or polymer.

Release of the bioactive agent from the fertilizer granule can occur in one, or two or more phases. A first release phase can be anytime from an immediate release to release over a period of approximately two weeks following application of the fertilizer. Release rates can depend on rate of dissolution of the bound biological agent, which may be in the form of a salt (e.g., ammonium or sulfate salts from granules). Delayed release of the bioactive agent can occur as a bolus over multiple phases or gradually over time. For example, bioactive agents can bind to amphoteric organic molecules in the outer regions of the core fertilizer granules and be slowly released into the soil depending on the amount of moisture in the soil, or when moisture is applied to the soil. Alternatively, the bioactive agents can be applied as a layer and or concentrically-constructed layer on a fertilizer granule such that there are at least two components to the granule including a core with a surrounding layer or a core with one or more concentric outer layers that are distinguishable from the core with respect to nutrient content, density, hardness, solubility, composition, microbial content and or permeability or a combination of these. The outer of these layers is the coating for the fertilizer which can occupy up to the outer approximately 200 μm of the granule structure as seen when the granule is cross-sectioned and observed under a microscope. The bioactive agent can be contained in the protective organic carrier and can be one or more of these concentric layers or coatings of fertilizer granules (see FIGS. 7 and 8).

Coatings may be utilized with surfactants to assist with spread ability and bridging of the coating and contained herbicide with the outer components of the granule. This includes the organic carrier layer as the surfactant which can assist in the spreading of such a layer and allow a minimum amount of carrier with the bioactive agent to be applied. Surfactants of virtually any class may be used. One advantage of a surfactant is that surfactants can be employed without regard to their physical properties. However, additional benefits can be realized when the surfactants chosen are supplied as liquids at ambient temperature. An example of surfactant is N-oleyl 1,3 diamino propane. Herbicides and pesticides are often available/dissolved as solvents in that they are dispersed in slightly polar solvents such as mineral spirits. These absorb into the coating and granule but when the surfactant(s) are utilized these can especially assist in the linking of the active agent to the organics and the organic matrix present in organically-enhanced, inorganic fertilizers.

A particularly advantageous coated fertilizer comprises a fertilizer core coated with a material such as a polymer that binds or contains one or more microorganisms selected for a particular end uses in beneficiating the target plant crop or is used in a bioremediation strategy for improving soil. Binding may be covalent, non-covalent (e.g., ionic), or both.

In a manufacturing step one or more layers of material, such as polymer, polymer precursors, smaller clay particles, biosolid or other organic material, may be applied to the core particle. A wide variety of materials and methods of their use are suitable for forming a layer. Embodiments of the invention further include adding a chemically durable (polymer or chemical coating) or mechanically durable (colloidal attachment and the like) coating and an organic carrier coating material to the core that, variously may incorporate one or more types of bacteria in such coating to add value as a bioremediation material or tool, a pesticide management material or tool or other use where a bacteria with nutrient desirably may be distributed, such as a farm or waste site. In advantageous embodiments, bioactive molecules and or a microorganism in a coating including an organic protective carrier, may be combined with a plant micronutrient such as magnesium, boron, manganese, and or zinc; and applied over a granule core.

Coatings applied to a fertilizer granule promote the maintenance of good physical conditions, like the flowability, during storage and handling as well as anticaking properties. Caking is the agglomeration of fertilizer particles by adhesion at their point of contact to form a compact mass that is difficult to break up. Caking has a negative influence on the flowability of a fertilizer, and thus, the coating minimize or eliminate caking upon storage. Coatings, including the organic carrier coatings should also contribute to protection against dusting of the fertilizer during storage or usage.

The coated fertilizers described herein provide compositions for organic containing fertilizers that can be used for soil remediation, or pasture and/or crop fertilization. Coating of a fertilizer core with one or more outer layers as described herein adds significant value by providing several advantages over uncoated fertilizers. One advantage is that the layered fertilizer protects and physically carries the bioactive agent with the fertilizer, which can reduce the number of field applications needed for a particular crop. A second advantage is that the layers or coatings can control or limit the release of active molecules from the fertilizer surface and or the structure of the coating itself. A third advantage is that the bioactive molecules in an organic carrier can aid in the attachment of the coating to the granules. The bioactive agents can show migration and may penetrate the core to a depth of from about 50 to about 500 μm, may penetrate the entire granule, or penetrate in different layers that are applied during manufacturing. Such penetration can also aid in the stability of the bioactive agent. Preferably the bioactive agents penetrate to within about 50 μm of the granule surface, within about 100 μm of the granule surface, within about 200 μm of the granule surface, within about 300 μm of the granule surface, within about 400 μm of the granule surface, or within about 500 μm of the granule surface. The depth of penetration can be used to provide controlled release of the bioactive agent, such as delaying release for weeks or months, such as, for example, about 2 to about 15 weeks, preferably from about 3 to about 12 weeks, and more preferably from about 3 to about 8 weeks. This release of the bioactive agent is an advantage to the grower in that drift of the bioactive agent on application is eliminated or at least minimized. A fourth advantage is that temperature-sensitive bioactive agents (heat or cold sensitive) in organic carrier coatings may be added to the granule after the fertilizer core has been formed in manufacture thereby protecting the agents from the high or low temperatures (e.g., greater than about 150° C. (302° F.) or less than about 0° C. (32° F.)) that may exist in the area or during manufacture or shipping. A fifth advantage is that the bioactive agent within the organic coating is protected from photo-degradation. A sixth advantage is that additional post-fertilizer application trips across the crop fields are eliminated because the bioactive agent is incorporated with the fertilizer thereby saving cost and energy. A seventh advantage is that exposure to the active agent that may be harmful to animals or persons, is limited during application by the coating. An eighth advantage is that insertion of bioactive agent directly with the fertilizer granule provides additional enhancement of the target crop dependent on the beneficiating property of the inserted agents, such as microorganisms. For example, microbes will be benefited by being carried on organically enhanced inorganic (sulfur or phosphate based) granule cores as opposed to being on traditional inorganic cores with no microbial nutrients.

Coated fertilizers as described herein can provide nutrient and/or microbial control to meet crop needs effectively and economically, thereby increasing yields and fertilizer costs (as in multiple applications) as to increase profits for the farmer. Previously heated or sterilized fertilizer particles may be subsequently coated with protective organic coatings that contain viable organisms. Such viable organisms can be in a dormant form or may be physically viably preserved as with freeze dried technologies.

Coated fertilizer granules may have one, two, three or more concentric layers and a central core. The core preferably contains organics that are bound to inorganics as described in U.S. Pat. No. 8,992,654 (e.g., ammonium sulfate molecules bound to organics obtained from municipal wastes such as biosolids, digested or undigested food wastes and or digested or undigested animal manures) (incorporated by reference). Similarly, the fertilizer can be ammonium phosphate based as in diammonium phosphate or monoammonium phosphate with the organics similarly bound with the ammonium or phosphate charged molecules.

A coated fertilizer may contain microorganisms in an outer zone of the granule core in in one or more concentric layers applied to a core. Preferably these microorganisms are contained in an organic protective carrier layer. Microorganisms that can be included in the coating include bacteria, algae, yeast, fungi, and/or combinations thereof (e.g., such as mixtures of microorganisms present in and isolated from natural flora, soil, water and within or on other organisms and genetically engineered microorganisms). Preferably, the microorganisms incorporated metabolize toxic chemicals or compounds, replenish depleted soil microflora, and/or enhance the transfer of nutrients to a target crop. Examples of microorganisms that can be incorporated include, but are not limited to species of *Pseudomonas, Nocardia, Mycobacterium, Aerobacter, Bacillus, Sacharomyces, Bacterium, Arthrobacter, Rhodococcus, Acinetobacter, Clostridium, Azotobacter, Fusarium, Flavobacterium, Corynebacterium, Achromobacter, Rhodotorula, Penicillium, Phycomyces, Aspergillus, Streptomyces griseus*, genetically engineered microorganisms, or a combination thereof, including but not limited to *Pseudomonas stutzeri* strain KC, *Nocardia salmonicolor, Nocardia globerula, Nocardia paraffinae, Nocardia poaca, Pseudomonas putida, Pseudomonas oleovorans, Pseudomonas aeruginosa, Pseudomonas fluoroscens, Mycobacterium phlei, Mycobacterium lacticola, Mycobacterium paraffinicum, Aerobacter aerogenes, Bacillus subtilis, Bacillus lichiniformis, Bacillus circulans, Bacillus polymyxa, Bacillus coagulans, Bacillus macerans, Bacillus azotofixans, Sacharomyces cereviseae, Bacterium acidipropionci, Bacterium aliphaticium liquifaciens, Arthrobacter paraffin-*

*ens*, *Rhodococcus rhodochrous*, *Acinetobacter calcoaceticus*, *Clostridium cellulolytican*, *Clostridium aerotolerans*, *Clostridium acetobutylican*, *Clostridium pasturianum*, the various *Azotobacter* sp., *Bacillis* sp., *Clostridium* sp., *Fusarium* sp., *Candida* sp., *Flavobacterium* sp., *Corynebacterium* sp., *Achromobacter* sp. *Acinetobacter* sp., *Rhodococcus* sp., *Pseudomonas* sp., *Mycobacterium*, *Nocardia* sp., *Rhodotorula* sp., filamentous fungi such as *Penicillium* sp. and *Phycomyces* sp., and *Aspergillus* sp., *Streptomyces griseus*, among others. Genetically engineered microorganisms are preferably engineered to produce enhancement of the target crop growth and fruit production or to improve the ability of the microorganism to metabolize toxic chemicals and compounds present in the soil to which the fertilizer is applied.

Preferably granules containing microorganisms are coated in a manufacturing step subsequent to heating and drying to avoid thermal destruction of the microorganisms. In such granules, release of microorganism may be preferably stimulated under predetermined environmental conditions which would activate or dissolve the outer protective layer of the granule. The microorganisms upon their release, are then able to utilize growth-stimulating nutrients derived from the organic carrier material or other components of the organically-enhanced granule.

Another embodiment of the invention is directed to method of contacting bioactive agents to fertilizers. Preferably the fertilizer contains organic material and is initially prepared as described in U.S. Pat. Nos. 7,947,104; 8,557,013 or 8,992,654 (all of which are specifically incorporated by reference). During or after the granulation process, the bioactive agent, preferably contained in a protective organic carrier material, e.g., liquefied dried milk, is contacted with the fertilizer forming coated granules. The bioactive agent may be combined with an agent that adheres to the fertilizer granules forming a coating. Contacting may be performed by spray the bioactive agent as a liquid onto the surfaces of granules, or by immersing the granules in a fluid. Additional coatings can be applied contained the same or different bioactive agents or combinations of agents. Preferably the final coating produces a smooth surface on the granules.

In conventional coating processes, the inclusion and ionic reactions between the added substance and the coating molecules is carried out prior to the application of the coating to the fertilizer granule. Further, many of these organic carriers will directly bind the chemical bioactive agent or the microorganism.

A coated fertilizer has been surprisingly discovered that provides multiple advantages. As disclosed and described herein, methods of coating fertilizer granules and the coated granules themselves incorporate bioactive agents. Preferably the contacting of the coating agent and the bioactive agent, and preferable the fertilizer granules, is performed at a temperature that does not reduce or significantly reduce the functional activity and/or viability of the bioactive agent, which is better preserved and protected. Preferably, a liquefied milk protein is such a coating that can be applied, for example, at about 20° C. to about 55° C. which, especially at the lower range, will have no inhibitory effect on the bioactive agent. These bioactive agents preferably are directly incorporated into such a milk coating and then sprayed onto the surface of the fertilizer granules. An advantage of such a coating is that it will also react with the organic and salt charges that exist on the surface of the fertilizer granules thereby binding the carrier on the granule surface. Unlike many of the coatings commonly used for granular fertilizers the granules do not have be heated to receive this organic coating. Because the milk protein and many of the other suitable organic coatings contain electrostatic charges or reactive chemical groups, they can interact with the fertilizer granules such that the bioactive compounds bind to the charged components of the coating. Also disclosed and described herein are methods for the production and use of coated granular fertilizers and the incorporation of bioactive agents within a carrier coating.

Many desirable procedures for generating the core for the fertilizer involve high heat that kill organisms (e.g., see U.S. Pat. Nos. 6,841,515, 8,992,654, and 9,856,178; all specifically incorporated by reference). For example, many organic materials may be brought to a high temperature to achieve the USEPA's Class A standard for treatment of pathogens and then cooled. The organic carrier containing the bioactive agents can be incorporated onto the granules after granule cooling from the high production heat ranging from about 70° C. to about 200° C. used in granule production that would otherwise destroy or damage the bioactive agent.

One embodiment of the invention is directed to double coated fertilizer granules wherein the first coating of the fertilizer granule is a protective deduster inner layer of oil, wax or polymer organic carrier. The second layer is the organic carrier layer containing one or more bioactive agents. An optional third protective coating of oil, wax or polymer may then applied over the organic carrier layer to enhance against dusting and help with granule integrity during handlings.

The preparation of the liquefied dry milk involves the dissolving of the dry milk in about pH 7.5 to about pH 14 solution of a strong mineral base, e.g., potassium hydroxide, at a range from about 20° C. to about 100° C. until fully dissolved and up to an additional 24 hrs. A temperature dependent transparent red to black solution is created. When this liquid milk solution (at about 75° F. (24° C.) to about 180° F. (82° C.)) is applied to acid surface of the granules of the present invention the casein in the solution will rapidly precipitate onto said granule surface forming a solid new surface. When a bioactive agent is incorporated within the liquid milk carrier the preferred range of granule application is from about 80° F. (27° C.) to about 95° F. (35° C.). The soluble milk solution was stable over time (at least 72 hours) during which the bioactive agent, such as microbial spores, can be mixed in to a defined titer. This mixture does require to be gently heated to about 80° F. (27° C.) to about 95° F. (35° C.) to be sprayed onto the granule, or preferably onto the protective oil, wax or polymer layer of the granule. Viscosity of the liquefied milk coating can be tailored by changing the amount of water in the coating solution, by changing the pH of the solution during initial processing or by changing the temperature and duration of initial processing. The percent solids of the soluble solution can reach about 55%. The advantage of higher solids is that less water is then applied on the granule thereby enhancing drying and reducing the potential for caking during the time period before a final protective coat is applied. Optionally, a brief warm air drying can be applied to further reduce any caking potential and assist the drying process. The dried milk in liquid form has electrostatic properties due to the contained amino acid side chains. Furthermore, upon application to the granule surface, a percentage of the contained microbes will be encapsulated in a casein matrix providing protection from the temperatures required for the final protective outer layer of oil, wax or polymer application and other environmental conditions associated with loading, transportation, and storage of the coated granules.

When the granules are field applied, the organics present in the granule core, and the organic carrier coating itself, such as the milk carrier coating, should provide benefits to the soil by providing amino acids, carbohydrates and fats. The nitrogen associated with milk layer would also serve as a source of slowly available nitrogen. Further, the carrier coating will contribute to the overall carbon content of the finished fertilizer granule. Because the coating is a reactive coating it should not migrate as deep into the granule as other coatings do.

The carrier coating material comprise from about 5 to about 60 pounds per ton of the dry mass of the fertilizer granule. Preferably the coating composition represents preferably at least about 10 to about 40 pounds per ton, even more preferably least about 10 to about 20 pounds per ton relative to the total dry weight of the granule.

Preferably a bioactive agent, which may be an organic or inorganic liquid ((e.g. aqueous) or a dry material, is mixed with an organic carrier such as liquefied dry milk, that adheres to the fertilizer granules during processing, or a solid bioactive agent is mixed with a liquid adhering organic carrier and applied to the fertilizer granules.

Preferably the core fertilizer granule contains matrices comprised of organic molecules (e.g., biomass), especially amphoteric molecules. The positive and negative charges of such molecules electrostatically bind to inorganic nutrient components such as the ammonium ion or sulfate ion as in the case of an ammonium sulfate fertilizer. The outer zones of this matrix with its amphoteric charges can be a binding mechanism for the carrier organic and the included bioactive agent such as a microbe, pesticide, herbicide or plant growth regulator. An outer layer or coating material may be added to a) form a barrier to rapid dissolution of the granule components including the carrier-incorporated bioactive agent, and b) to protect the carrier layer and the contained granule from humidity and handling, and to reduce dust formation. Molecular binding of the bioactive agent to the granule may be to the sulfate or phosphate groups that are exposed in and/or on the surface of granules especially in the outer 100 µm zone of the core or on the core surface. The bioactive agent binding to the organic carrier can be covalent or non-covalent such as ionic in nature. Similarly, the binding of these agents to the organic carrier can be electrostatic/ionic bonding.

An advantageously coated fertilizer of the present invention comprises a fertilizer core coated with a protective material such as an oil, wax or polymer. This coated granule will then contain another layer comprised of an organic carrier containing the bioactive agent or agents. In the preferred embodiment this double coated granule can contain an outer protective layer comprised of an oil, wax or polymer.

Coating of a fertilizer core with one or more outer layers as described herein adds significant value by providing several advantages over uncoated fertilizers. One advantage is that the layered fertilizer physically carries the bioactive agent with the fertilizer, which can reduce the number of applications needed for a particular crop. A second advantage is that the layer or coating can control or limit the release of active molecules from the fertilizer surface and or the structure of the coating itself. A third advantage is that the bioactive molecules can attach to the carrier organics and the surface of the granules as the coating. A fourth advantage is that temperature-sensitive bioactive agents may be added to the carrier coating or outer regions of the granule after the fertilizer core has been formed in manufacture thereby protecting the agents from the high temperatures (e.g., greater than about 70° C.) that may exist during manufacture or the application of a final surface coating of oil, wax or polymer prior to shipping. A fifth advantage is that the bioactive agent within the carrier coating is protected from photo-degradation. A sixth advantage is that additional application trips across the crop fields are eliminated thereby saving cost and energy. A seventh advantage is that exposure to the active agent that may be harmful to animals or persons, is limited during application by the carrier coating. An eighth advantage is that insertion of bioactive agent directly with the fertilizer granule provides additional enhancement of the target crop dependent on the beneficiating property of the inserted agents, such as microorganisms. For example, microbes will be benefited by being carried on organically enhanced inorganic (sulfur or phosphate based) granule cores as opposed to being on traditional inorganic cores with no microbial nutrients. As such, carrier coated fertilizers as described herein can provide nutrient and/or microbial control to meet crop needs effectively and economically, thereby increasing yields as to increase profits for the farmer.

Previously heated or sterilized fertilizer particles may be subsequently coated with carrier coatings that contain viable organisms. Such viable organisms can be in a dormant form or may be physically viably preserved as with freeze dried technologies.

The organic carrier coated fertilizer granules may contain micronutrients beneficial to the viability and physiological activity microorganisms, especially when reactivated upon application to soils. Micronutrients and/or the microorganisms may be in one or more of the outer zones of the granules, and/or in one or more layers around the core granule. The carrier layer itself, as per the dry milk example, will provide proteins, amino acids, lactose and fats. The microorganisms upon their release, are then able to utilize growth-stimulating nutrients derived from other components of the organically-enhanced granule.

Preferably the organic carrier layer is applied following the cooling of hot granules in the manufacturing process. containing microorganisms heating to avoid thermal destruction of the microorganisms. The carrier may be applied to ambient granules or to granules that are about 20° F. (7° C.) above ambient.

Another embodiment of the invention is directed to method of contacting the organic carrier layer containing the bioactive agent to the granular fertilizer surface. Preferably the fertilizer contains organic material and is initially prepared as described in U.S. Pat. Nos. 7,947,104; 8,557,013 or 8,992,654 (specifically incorporated by reference). The bioactive agent may be combined with an organic carrier that adheres to the fertilizer granules forming a coating, e.g., the liquefied dry milk. Contacting may be performed by spraying the carrier as a liquid onto the surfaces of granules, or by immersing the granules in a fluid of the carrier. Additional carrier coatings can be applied containing the same or different bioactive agents or combinations of agents. Preferably just prior to shipping, a final protective layer of oil, wax or polymer is applied to the carrier coated granule. The present invention also allows the organic carrier layer and the final outer protective layer to be applied at satellite fertilizer distribution sites away from the fertilizer manufacturing plant.

The liquid organic carrier material will allow the bioactive agent to be added prior to its application to the granules. The preferred carrier will maintain the function or viability of such bioagent for about 24 hours, and more preferably for at least about 72 hours in liquid form prior to application.

Methods for applying the coated fertilizer granules include in-situ remediation which provides a low-cost treatment for environments contaminated with hazardous wastes. Environments that can be treated include contaminated areas of land (e.g. landfills, contaminated fields, pastures) and areas that have undesired hydrocarbon contaminants. The utilization of fertilizers containing microorganisms that can digest unwanted contaminants provide a means of treating hazardous materials without the need for extraction or evacuation of contaminated materials. In addition, bioremediation, both biostimulation and bioaugmentation, requires periodic or continuous introduction of nutrients or buffers to sustain active populations of bacteria, capable of degrading hazardous wastes in situ. For treatment of many sites, delivery of nutrients or other environmental modifiers may be needed over sustained periods of time. The coated fertilizer granules described herein provide an inexpensive means of delivering micronutrients (e.g. controlled levels of nutrients to maintain active microorganism populations), microorganisms, or chemical reactants to effect degradation over extended periods of time. This is accomplished by delivering a solid phase fertilizer granule capable of delivering via dissolution the nutrients, microbial environmental modifiers and/or reactants capable of biologically remediating an environment contaminated with hazardous materials. In addition, coating slow-release or delayed release fertilizer granules allow additional control of nutrient release in a growth season.

The following examples illustrate embodiments of the invention but should not be viewed as limiting the scope of the invention.

EXAMPLES

Example 1

For an amide-based coating, the material is an amide composed of a fatty acid esterified to a C18 stearyl amine. The fatty acid may be of different carbon lengths, optimally at C12 or C14 carbons, but more preferably at C16 or C18 carbons. This amide is solid at ambient temperatures below about 52° C. (125° F.). In an embodiment using this amide compound, the coating will permit some binding of the amide with the active group on the bioactive molecule. The primary binding occurs between the bioactive molecule and the sulfate components both on the surface of and within the outer 100 µm of the granule. The bioactive substance (e.g., herbicide and/or pesticide) also binds with organics or matrix containing negative charges that are in the granule core as the herbicide or pesticide migrates from the coating into the granule surface and core structure. The bioactive molecule also binds with iron and aluminum molecules that are also on the granule surface and core structure.

Coatings may comprise an oil or a paraffin wax with a melting point of about 49° C. (120° F.) to about 63° C. (145° F.) and preferably between about 52° C. (125° F.) and about 57° C. (135° F.). The wax coating is used to contain and apply the bioactive molecule to the fertilizer granule core. The wax is a solid at ambient temperatures and at temperatures below about 54° C. (130° F.). To facilitate the distribution and adherence of the bioactive substance to the coating molecules a surfactant is mixed with the molten wax prior to application to the granular fertilizer. The surfactant is N-oleyl 1-1,3, diamino propane and the hydrocarbon end interacts with the wax and permits a binding with an herbicide or pesticide. The diamine surfactant can serve as a bridge between the carboxylic acid and the granule surface, anchoring the herbicide to the granule surface until the fertilizer is dissolved and the herbicide releases to the soil.

The procedure for the addition of the bioactive substance to the coating is to warm the coating formulation of wax and surfactant to a temperature of about 60° C. (140° F.) and add the correct amount of warmed herbicide to this warm liquid coating. Preferably the mixing container is heated and insulated to prevent solidification of the coating either during addition of the bioactive agent and or during storage prior to transport or use. The amount of bioactive agent to be added to the coating varies as to the recommendations for the specific herbicide to be applied. As the coating is applied between 2# and 30# per ton of the dry mass of the fertilizer it should contain sufficient herbicide, pesticide, plant growth agent, or microbe such that agronomic application rates of the fertilizer will yield sufficient herbicide or pesticide into the treated soil to inhibit or kill the unwanted vegetation or allow effective action. Bioactive substances such as an herbicide (e.g., Atrazine) may be added in a separate coating step, as in a spray, to be applied prior to the final coat of amide or wax such that the herbicide would then reside in the outer approximate 100 µm of the granule structure underneath either the outer coating.

As disclosed in U.S. Pat. Nos. 8,992,654 and 9,856,178, some of the herbicide or pesticide directly bind with the sulfate groups on the surface of the granule as the fertilizer is an organically enhanced ammonium sulfate. On application of the fertilizer to the soil of the target crop as per agronomic rates the herbicide or pesticide will be slowly released on dissolution of the granular fertilizer as a salt, e.g., a sulfate salt, and be available in the soil to inhibit unwanted vegetation, e.g., weeds or pests. Similarly, release of contained microbes will occur on dissolution of the granular fertilizer components.

Figure 6:
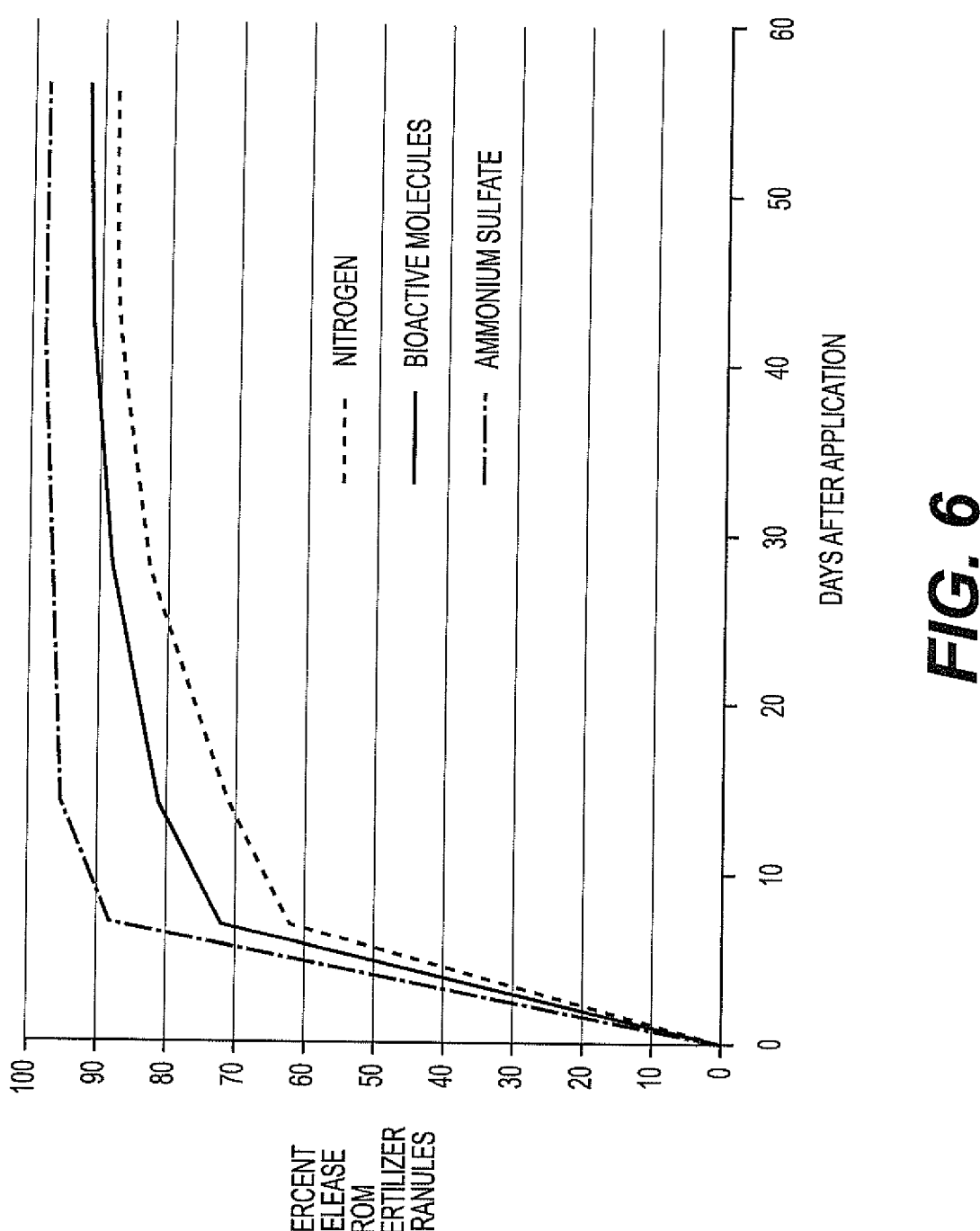
FIG. 6. Graph showing the release of bioactive molecules, nitrogen and ammonium sulfate from fertilizers prepared as described herein over a period of days after application to soil.

Average application amounts for the referenced fertilizers of this invention, as, for example, set forth in U.S. Pat. Nos. 8,992,654, and 9,856,178 (specifically incorporated by reference), are 1 to 2 pounds of nitrogen content per 100 square feet of turf, and on average, approximately 150 to 400 pounds of product per acre for row crops such as corn, cotton, rice and wheat. When the fertilizer containing the bioactive molecules are applied to the target crops the herbicide or pesticide is released as a free molecule leaving a salt (e.g., calcium salt or bicarbonate) as a precipitate on the fertilizer granule surface. This release mechanism is very advantageous in the control of unwanted vegetation in that the release occurs in two phases following the release of nutrients (e.g, nitrogen) from the granule. The majority of the bioactive molecule will be released within the first two weeks following application of the fertilizer (see FIG. 6) with the remainder being slowly released over the next three to twelve weeks and more preferably being released slowly over the period of three weeks to 8 weeks.

Example 2

Figure 4:
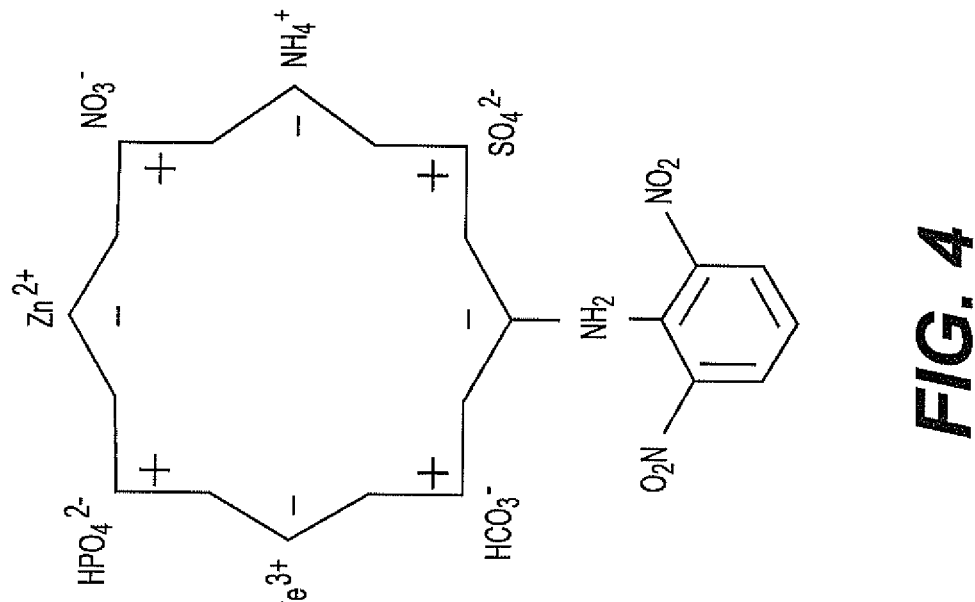
FIG. 4. Diagram of herbicide (Dinitroaniline) primary amine binding to the organic matrix contained in the outer zone of the organically-enhanced, ammonium sulfate fertilizer granule.
Figure 5:
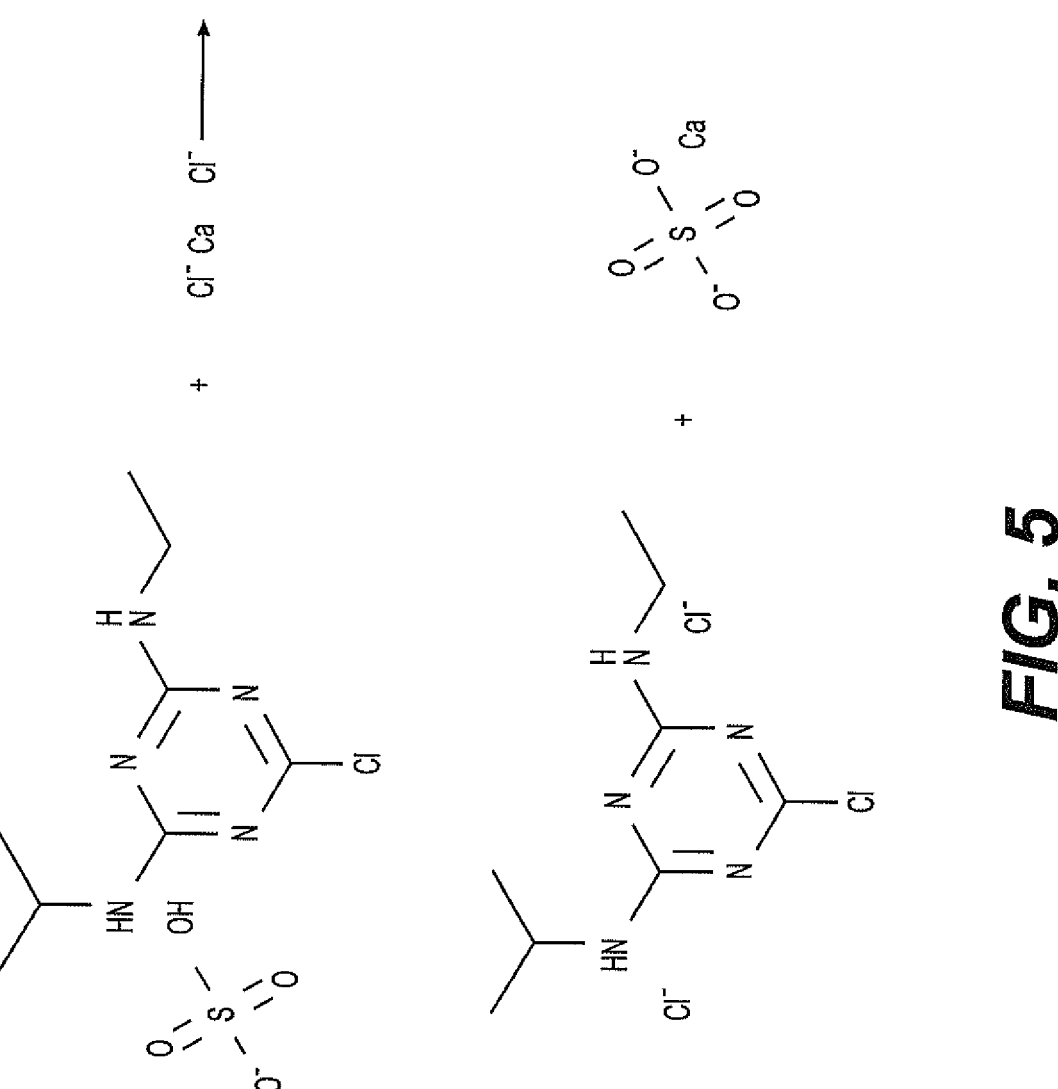
FIG. 5. Atrazine bound ionically to granule bisulfate surface reacts with calcium chloride or other cationic salt to form free Atrazine and either a precipitate or a bicarbonate salt on the surface of the granule.

Wet community waste organics comprised of digested food waste and manures (also referred to as biosolids) are received at a fertilizer manufacturing facility with a percent solids of about 17.0 percent. The plant is set up to operate at an organics processing rate of 220 wet tons per day. In this example, the material is mixed with previously dried organic materials to yield a preferred percent solids of about 20% to 26%, or more preferably about 22% to 24% solids. This conditioned organic mix is pumped into the first vessel for hydrolysis. At the orifice of the first vessel, the conditioned organic mix is further mixed with 93% sulfuric acid in an amount pre-calculated to yield a degree of heat of hydration of about 110° C. (230° F.) and a total of about 17% sulfur in the finished fertilizer. The contents of the vessel are mixed vigorously at a rate of 360 RPM for between about 30 seconds and ten minutes or, preferably for between about two minutes and six minutes. Within the vessel, the acidified mix gradually is forced to the upper quarter of the vessel where it is discharged after the reaction. In this first vessel, proteins from the organics are hydrolyzed to various length of polypeptides or, preferably, to monomeric amino acids. Other macro-organic compounds that are present are also hydrolyzed to smaller molecular forms. Hydrolysis increases the fluidity of the contents of the vessel, preferably to less than 1000 cP. This now fluidized, acidified mix is then transferred under pressure to the bottom orifice of a second pressure vessel for ammoniation, wherein it is mixed with vaporized anhydrous ammonia sufficient to raise the temperature of the mix to over about 150° F. (65° C.) (or alternatively over about 300° F. (149° C.)). The internal pressure of the second vessel can equal or exceed about 35 psi and is sufficient to cause the concentration of nitrogen (N) in the final formulation of the resultant fertilizer to between about 16% to about 17% nitrogen by dry weight of the finished product. The ammoniated mix is maintained in the second pressure vessel for six minutes of reaction time before it is discharged through an orifice to the granulator. The discharged mix (also referred to as a melt) is slightly increased in viscosity compared to the discharge of the first pressure vessel, but preferably has a viscosity of less than about 1200 cP. This discharged melt is under pressure and therefore enters the granulator to be sprayed onto a receiving bed of recycled fertilizer granules (e.g., crushed fertilizer material or undersized fertilizer material or fertilizer dust material collected from the various dust collectors contained in the process air treatment system). The spray coats the receiving fertilizer granules and gradually builds up a series of coatings or agglomerated material, such that the granular fertilizer is produced in which the majority of the material is of the desired product size. Desired sizes may be, for example, about 1.7 mm to about 3.5 mm (170 sgn to 350 sgn; "size guide number") diameter granules, suitable for use in commercial agriculture. Subsequent or simultaneously with application of the sprayed coating, an amount of a hardener is applied to the granules in the granulator. Preferably, the hardener amount is sufficient for the hardness of the finished granules to reach a range of about 5 lbs. to 8 lbs. crush strength. This material is then dried to about 98% or more solids, for example in a rotary drum dryer, and then screened to one of three commercial sizes of approximately 1.7 mm to 1.9 mm, approximately 1.2 mm to 1.4 mm, and to approximately 2.6 mm to 3.5 mm. Smaller material is returned to the granulator as part of the recycle bed. All larger material is crushed in a chain mill and also returned to the granulator as part of the recycle bed. A portion of the proper sized product, preferably approximately 2.4 mm to approximately 3.0 mm for commercial product size, may also be returned to the recycle bed to maintain the mass balance of the production process. The steps of this process were performed under negative pressure to minimize dust and to prevent odors being released into the manufacturing environment. Process air was treated through a robust odor control system such that no noxious odors were perceived at the fence line of the manufacturing property. Scrubbed nutrients such as ammonium ion, in this example—ammonium sulfate, were returned to a process water tank wherein it was added to the first mixer to help control the solids content and the fluidity of the conditioned mix entering the first pressure vessel. This maximizes the efficiency of the manufacturing process so that the only discharges from the fertilizer manufacturing process are treated condensed water (from the municipal organic material and any cooling water that may need to be discharged from the cooling system) along with the treated process air. In the fertilizer manufactured in this example the slow-release percentage of nitrogen was about 30% of the total nitrogen in the product. This slow-release nitrogen is in the form of an organic matrix in which the positive charged ammonium ion is electrostatically bound to a negative charge on the organic compounds such as polypeptides and amino acids that comprise the core of the matrix. After exiting the rotary dryer, the product is passed through a product cooler to reduce the temperature of the product to between about 115° F. (46° C.) and about 160° F. (71° C.), and more preferably between about 130° F. (54° C.) and about 150° F. (65° C.). This cooled product is coated with about 5 to about 10 pounds per ton of an amide hydrocarbon coating initially at an average granule temperature of about 135° F. (57° C.) with the coating temperature set to about 160° F. (71° C.). The product then is transported to the warehouse pending shipment. When shipping is scheduled, the product is coated a second time with an additional 10 to 20 pounds per ton product. The herbicide will be contained in this coating or may be applied as a spray prior to the application of the final coat layer as in a shipping coat. In this example Atrazine is used (see FIGS. 3, 4 and 5). Atrazine is a herbicide of the triazine class. Atrazine is used to prevent pre- and post-emergence broadleaf weeds in crops such as maize (corn) and sugarcane and on turf, such as golf courses and residential lawns. It is one of the most widely used herbicides in U.S. and Australian agriculture. The Atrazine is added to the amide coating as a lipid soluble blend. Upon being applied to the fertilizer granule the coating with Atrazine solidifies and forms a very dust resistant, handling resistant surface coating. The Atrazine located at the interface with the coating will bind to the exposed bisulfate anions in the outer approximate 100 μm of granule structure (see FIGS. 1 and 3). The Atrazine that is carried in the body of the solidified amide coating will slowly migrate and find additional bisulfate molecules to bind to. The Atrazine is contained in the organically enhanced ammonium sulfate fertilizer such that the dry mass of the herbicide is between 0.25% and 0.75% of the mass of the product. This means that between 5# to 15# of herbicide needs to be included in a ton of the molten coating prior to application to the granules. This quantity may require a separate embodiment in which the Atrazine or other herbicide to be added in a separate coating step to be applied prior to the final coat of amide or wax such that the herbicide would then reside in the outer approximate 100 μm of the granule structure underneath either the outer amide coating or the wax coating.

The result is a smooth coated granular fertilizer with enhanced protection against dusting and handling in warehouse storage and for transport and handling by the intermediate fertilizer distributor and finally by the end-user—the grower farmer. The product of this example contained a 98% dry granular fertilizer with a nutrient formulation of 16-1-0-20-1-16 (N—P—K—S—Fe-Organic) by dry weight of the finished granules containing sufficient Atrazine (about 0.5% to about 1.5% w/w) to inhibit unwanted vegetation.

Example 3

In granules formed as in Examples 1 and 2, a coating is applied containing the herbicide 2,4-D, is applied as lipid soluble herbicide in a refined paraffin wax that has a melting point of about 131° F. (55° C.). Again between about 5 and about 30 pounds of coating per ton of product are used. The 2,4-D again binds to the sulfur and organic molecules on the surface of the granule and in the outer 100 μm of the granule. This binding increases over time as the 2,4-D in the solidified wax coating migrates to the surface of the granule and finds more sulfate to ionically bind to. The concentration of the 2,4-D in the finished fertilizer is usually between 0.05% and 0.5% as based on agronomist recommendations.

Example 4

In fertilizer granules formed as in Examples 1 and 2, a refined wax coating containing a surfactant is applied at 25# per ton and which coating containing a herbicide from the sulfonylurea class. This is an effective herbicide class that kills broadleaf weeds and some annual grasses. One of its active forms is sold as Metsulfuron-methyl, which is a systemic compound with foliar and soil activity that inhibits cell division in shoots and roots that has excellent compatibility with a paraffin wax coating with its aromatic rings and binds well to the sulfate and organic molecules in the outer 100 μm of the fertilizer at a fertilizer pH of between about 4.5 and about 6.0. This binding enhances the stability of the herbicide becoming an advantage over other methods of application.

Example 5

In fertilizer granules made similarly to the method of Example 1 however, with the difference that a diammonium phosphate-based fertilizer was manufactured. This fertilizer was coated with 25 pounds of a refined paraffin wax. The nutrient formulation of this fertilizer is 16-34-0-7-1-12 (N—P—K—S—Fe-Organic by dry weight). A dinitroaniline class herbicide was added to the hydrocarbon amide coating. This herbicide has an excellent compatibility to the wax coating because of its lipophilic nature and binds well to the phosphate and organic components, especially the organic matrix in this fertilizer, in the outer range of the granule core and surface area. The tight organic binding exhibited by the nitroaniline contributes to the slow release of this herbicide in the field thereby extending weed control.

Example 6

In fertilizer granules made similarly to the method of Examples 1 and 2, with the difference that a diammonium phosphate-based fertilizer core was manufactured. The nutrient formulation of this fertilizer is 14-24-0-10-1-10 (N—P—K—S—Fe-Organic by dry weight). The first coating on the manufactured fertilizer core is a light-weight mineral oil-based coating which contains a suspension of freeze-dried *Acinetobacter calcoaceticus* applied to the granule cores are a rate of about 12 pounds coating per ton of core. After drying, this core plus first coating is then further coated with a protective layer of about 20 pounds per ton of a warmed paraffin wax or about 20 pounds of a warmed oil-based amide coating, both of which are solids at about 75° F. (24° C.).

Example 7

In fertilizer granules made similarly to the method of Examples 1 and 2, with the difference that a diammonium phosphate-based fertilizer core was manufactured. The nutrient formulation of this fertilizer is 14-24-0-10-1-12 (N—P—K—S—Fe-Organic by dry weight). The first coating on the manufactured fertilizer core is a modified tall oil-based coating which contains an amide linkage in the middle of a long hydrocarbon chain to assist in binding to the outer zone region of the granule core. This first coating is applied to the hot (about 130° F. (55° C.) to about 160° F. (71° C.)) granule cores during manufacture at rate of 10 pounds coating per ton of core. After drying, this core plus first coating is then further coated, often at the time of shipping, with a protective layer of about 22 pounds per ton of a similar tall oil coating containing 3% active Imidacloprid 2F by mass of coating. This is a good active agent for fertilizers that contain organics in their structure as Imidacloprid binds to organics making it possible for insecticide to be released slowly over time after application. Imidacloprid works well at a per acre application of about 0.1 pounds per acre of active compound. If the fertilizer of this example is applied at a typical application of about 300 pounds per acre then each acre would be treated with about 0.1 pound of active Imidacloprid 2F. This concentration would fit well in a 3 times a year application protocol as regulations limit the maximum amount of Imidaclosprid 2F to less than 0.4 pounds of active compound per acre. This is a particularly useful inclusion as Imidacloprid is a systemic insecticide that acts as an insect neurotoxin and belongs to a class of chemicals called the neonicotinoids. Imidacloprid is widely used for pest control in agriculture.

Example 8

Fertilizer granules are prepared as in Examples 1 and 2. A spray coating is applied containing an amount of a herbicide which together coat the fertilizer granules. A second liquid is introduced to the fertilizer granules through the same or a different nozzle, again via spraying, containing plant nutrients plus an amount of a hardener. Preferably, the hardener amount is sufficient for the hardness of the finished granules to reach a range of about 5 lbs. to about 8 lbs. crush strength. This material is then dried to about 98% or more solids in a rotary drum dryer. The resulting fertilizer product is a smooth coated granular fertilizer with enhanced protection against dusting and handling in warehouse storage and for transport and handling by the intermediate fertilizer distributor and finally by the end-user, the grower farmer. The product contains multiple coating layers with sufficient Atrazine (0.5% to 1.5% w/w) to inhibit unwanted vegetation, and sufficient nutrients to promote plant growth and development.

Example 9

Fertilizer granules containing 17% N, 1% P; 0% K; 20% S and 16% Organic by dry weight of the finished granule are manufactured according to U.S. Pat. Nos. 7,947,104; 8,557, 013; 8,992,654; and/or 9,856,178 (specifically incorporated by reference). The granules have been coated with a deduster oil at 15 pounds per ton of fertilizer before they are placed in a fertilizer warehouse at the manufacturing plant. This granular product is coated with the 15 pounds per ton of an oil hydrocarbon coating initially at an average granule temperature of about 140° F. (60° C.) with the coating temperature set to about 180° F. (82° C.). The organic component of this fertilizer was obtained from acid-hydrolysed heat dried biosolids pellets manufactured by a large municipal waste-water treatment facility. The plant is set up to operate at an organics processing rate of 400 wet tons per day. Desired finished granule sizes may be, for example, about 1.5 mm to 4.0 mm (150 sgn to 400 sgn; "size guide number") diameter granules, suitable for use in commercial agriculture. The preferred size for row crop fertilizer will be about 2.8 mm to about 3.4 (280 sgn to 340 sgn). In the fertilizer manufactured in this example the slow-release percentage of nitrogen was about 30% of the total nitrogen in the product. The majority of this slow-release nitrogen is in the form of an organic matrix in which the positive charged ammonium ion is electrostatically bound to a negative charge on the organic compounds such as polypeptides and amino acids that comprise the core of the matrix.

Prior to shipping, these granules which have been coated with an initial protective deduster layer, are coated with an organic carrier layer comprised of liquefied dry milk powder in an aqueous alkaline solution at about pH 8.8. This liquefied milk was prepared by treating the dry milk powder with an alkaline solution of potassium hydroxide at about pH 8.8 creating reddish solution. This solution is inoculated with a bioactive microbial agent. A microbial agent includes biological compounds obtained from or synthesized by a microorganism. A microbial agent may comprise *Paenibacillus polymyxa* spores (previously known as *Bacillus polymyxa*). These spores will germinate in the soil and provide pathogen protection for the crop roots. This organic carrier coating containing the spores is applied by spraying at a temperature of about 89° F. (32° C.). The organic carrier at about 40% solids was applied at a rate of 15 pounds per ton of finished fertilizer. The *P. polymyxa* spore titer in the carrier was at about $10^4$ per gram of coating. This amount of carrier coating will adhere rapidly to the coated granule surface following the spraying application. The carrier/spore coated granules at about 85° F. (29° C.) are then coated with a final protective low viscosity oil coating at an additional 15 pounds per ton. The application temperature of the sprayed outer coating oil is about 130° F. (54° C.). These finished granules are then stored in bins or are conveyed to a bagging facility, a truck loading area or a rail loading area.

Other embodiments and uses of the invention will be apparent to those skilled in the art from consideration of the specification and practice of the invention disclosed herein. All references cited herein, including all publications, U.S. and foreign patents and patent applications, and specifically the reference *Ullmann's Encyclopedia of Industrial Chemistry*, Published by Wiley-VCH Verlag GmbH & Co. KGaA (2002), are specifically and entirely incorporated by reference. It is intended that the specification and examples be considered exemplary only with the true scope and spirit of the invention indicated by the following claims. Furthermore, the term "comprising of" includes the terms "consisting of" and "consisting essentially of."

The invention claimed is:

1. A fertilizer granule comprising:
a nutrient core having
a matrix of organic molecules; and
inorganic nutrients bound to the organic molecules;
a coating having a first layer including a carrier compound comprising a milk-based substance; and
a bioactive agent extending between the nutrient core and the coating; and
a second layer free of bioactive agents that comprises an oil, a wax, or their combination consisting of a paraffin wax, oil-based amide, or tall oil.

2. The fertilizer granule of claim 1, wherein the bioactive agent is ionically bound to the organic molecules of the matrix.

3. The fertilizer granule of claim 1, wherein the bioactive agent is anchored via electrostatic charges.

4. The fertilizer granule of claim 1, wherein the bioactive agent binds both the nutrient core and the carrier compound.

5. The fertilizer granule of claim 1, wherein the bioactive agent penetrates within about 50 to 400 $\mu$m of the nutrient core, as measured from the nutrient core surface.

6. The fertilizer granule of claim 1, wherein the carrier compound further includes one or more of agar, almond flour, amaranth flour, aquafaba, synthetic egg white, buckwheat flour, chickpea flour, cocoa flour, corn starch, cream, liquefied or non-liquefied dry milk powder, egg white, gelatin, gluten, guar gum, lignosulfonate, liquid glucose, microcrystalline cellulose, nut butter, polyacrylamides, potato starch, povidone, poly vinylacetate, sorghum flour, soy flour, soy powder, spoiled milk, tapioca, teff flour, wheat flour, whey, and xanthan gum.

7. The fertilizer granule of claim 1, wherein the bioactive agent includes an herbicide, pesticide, insecticide, fungicide, microorganism, enzyme, nutrient, plant hormone, plant growth regulator, or their combination.

8. The fertilizer granule of claim 1, wherein the milk-based substance includes liquefied or non-liquefied dry milk powder, spoiled milk, or whey.

9. A solid particulate fertilizer comprising:
an inner nutrient core having
an organic material portion and
an inorganic portion; and
an outer coating layer comprising an oil, a wax, or their combination consisting of a paraffin wax, oil-based amide, or tall oil, surrounding the inner nutrient core, having
a carrier compound including a flour-based substance and
a bioactive agent, the bioactive agent being anchored in the inner nutrient core to the organic material portion, inorganic portion, or both.

10. The solid particulate fertilizer of claim 9, further comprising an additional outer coating layer comprising a non-polymeric wax or oil, the additional outer coating layer being free of a bioactive agent.

11. The solid particulate fertilizer of claim 9, wherein the bioactive agent is bound to the carrier compound via electrostatic charges.

12. The solid particulate fertilizer of claim 9, wherein the carrier compound further includes one or more of agar, aquafaba, synthetic egg white, corn starch, cream, liquefied or non-liquefied dry milk powder, egg white, gelatin, gluten, guar gum, lignosulfonate, liquid glucose, microcrystalline cellulose, nut butter, polyacrylamides, potato starch, povidone, poly vinylacetate, spoiled milk, tapioca, whey, or xanthan gum.

13. The solid particulate fertilizer of claim 9, wherein the bioactive agent includes an herbicide, pesticide, insecticide, fungicide, microorganism, enzyme, nutrient, plant hormone, plant growth regulator, or their combination.

14. The fertilizer granule of claim 9, wherein the flour-based substance includes almond flour, amaranth flour, buckwheat flour, chickpea flour, cocoa flour, sorghum flour, soy flour, soy powder, teff flour, or wheat flour.

* * * * *